United States Patent [19]

Herndon

[11] Patent Number: 4,739,973
[45] Date of Patent: Apr. 26, 1988

[54] CHEMICAL EXTRACTION OF METALS FROM ORES

[76] Inventor: J. Marvin Herndon, 11044 Red Rock Dr., San Diego, Calif. 92131

[21] Appl. No.: 42,179

[22] Filed: Apr. 24, 1987

Related U.S. Application Data

[63] Continuation-in-part of Ser. No. 896,441, Aug. 13, 1986, abandoned.

[51] Int. Cl.$^4$ .............................................. C22B 3/02
[52] U.S. Cl. .................................... 266/101; 266/168; 266/170; 75/101 R; 75/105; 204/105 R; 423/27; 423/29; 423/150
[58] Field of Search ............ 266/101, 168, 170; 75/101 R, 105; 204/105 R; 423/27, 29, 150

[56] References Cited

U.S. PATENT DOCUMENTS

| | | | |
|---|---|---|---|
| 4,017,309 | 4/1977 | Johnson | 423/27 |
| 4,318,892 | 3/1982 | Von Kohorn | 75/101 R |
| 4,473,532 | 9/1984 | Rose et al. | 266/168 |
| 4,526,615 | 7/1985 | Johnson | 423/150 |

Primary Examiner—Robert L. Stoll

[57] ABSTRACT

A novel system for chemically leaching ore that decreases pollution to the environment and that enhances reaction kinetics and economic considerations. An impervious covering (18) blankets a distribution network of drip lines (17) laid over the ore heap (14). A lixiviate containing solution is forced by means of a pump (11) through a venturi eductor (19) into the distribution network of drip lines (17) for application to the ore heap (14). After percolating through the ore heap (14), the leach solution is recycled through a recovery system (16) to the venturi eductor (19).

17 Claims, 1 Drawing Sheet

CHEMICAL EXTRACTION OF METALS FROM ORES

BACKGROUND—FIELD OF INVENTION

This is a continuation-in-part of Ser. No. 896,441 filed Aug. 13, 1986, now abandoned.

The present invention relates generally to hydrometallurgical extraction of metals from ores. More particularly, the present invention relates to chemical heap leaching of ores, being especially useful for protecting the environment, for reducing water loss, for enhancing chemical reaction rates, and for performing a variety of other functions. The present invention relates also to vat or tank leaching of ores.

BACKGROUND—DESCRIPTION OF PRIOR ART

Various embodiments of the concept of chemical leaching are known to those skilled in the art including, for example, vat leaching, pond leaching, pachuca tank leaching, and heap leaching. In recent years heap leaching has become commercially important, particularly for the extraction of gold and silver from their ores. See, for instance, P. G. Chamberlain and M. G. Pojar, *Gold and Silver Leaching Practices in the United States,* Bureau of Mines Information Circular No. 8969 (1984).

In the practice of heap leaching, heaps of ore, typically 20 to 30 feet high, are formed on impervious pads. Lixiviate containing water, heretofore sprinkled or sprayed upon the heap, percolates downward through the heap dissolving metal values, drains, passes through a recovery system, and is recycled to the sprinklers or sprayers. Heap leaching has the advantage of allowing large quantities of low grade ore to be leached at a relatively low cost. However, heap leaching as previously practiced has disadvantages. The lixiviate containing water spray is subject to evaporative loss and to windblown loss. Droplets of leach solution blown by the wind to the surroundings can contaminate the environment with toxic lixiviates such as sodium cyanide as well as with toxic substances leached from the ore. Spraying the lixiviate solution into the air leads to high rates of water evaporation. In addition to wasting water, evaporation causes heat to be lost thus lowering the temperature of the lixiviate solution and, consequently, lowering the chemical leaching reaction rate. Moreover, spraying the lixiviate solution into the air exposes a large surface area of the solution to sunlight thereby increasing potential photochemical degradation of photosensitive lixiviate compounds.

OBJECTS AND ADVANTAGES

I have invented a novel system for chemically leaching ore whereby the above-mentioned disadvantages and difficulties previously encountered are either overcome or reduced to a minimum.

A principal object of the present invention is to prevent contamination to the environment by wind-blown toxic heap leach spray.

Another object of the present invention is to minimize or to prevent evaporative water loss.

An additional object is to reduce the evaporative cooling effect associated with leaching thereby accelerating the chemical leaching reaction rate.

A further object is to improve solar heat collection thereby further accelerating the chemical leaching reaction rate.

A yet further object is to provide a means to introduce gases, especially air, into the leach solution.

An still further object is to minimize photochemical degradation to photosensitive components of the leach solution.

Readers will find other objects and advantages of the invention from a consideration of the ensuing description and the accompanying drawings.

DRAWING FIGURES

DRAWING REFERENCE NUMERALS

10—barren solution reservoir
11—pump
12—grid of distribution lines
13—sprinklers heads
14—ore heap
15—impervious pad
16—recovery system
17—distribution network of drip lines
18—impervious covering
19—venturi eductor
20—suction inlet of the eductor

DETAILED DESCRIPTION

When sodium cyanide solution contacts free gold, leaching occurs, it is believed, according to the following reactions:

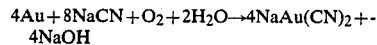

and

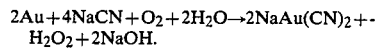

The reactions involved depend strongly upon oxygen.

Figure 1:
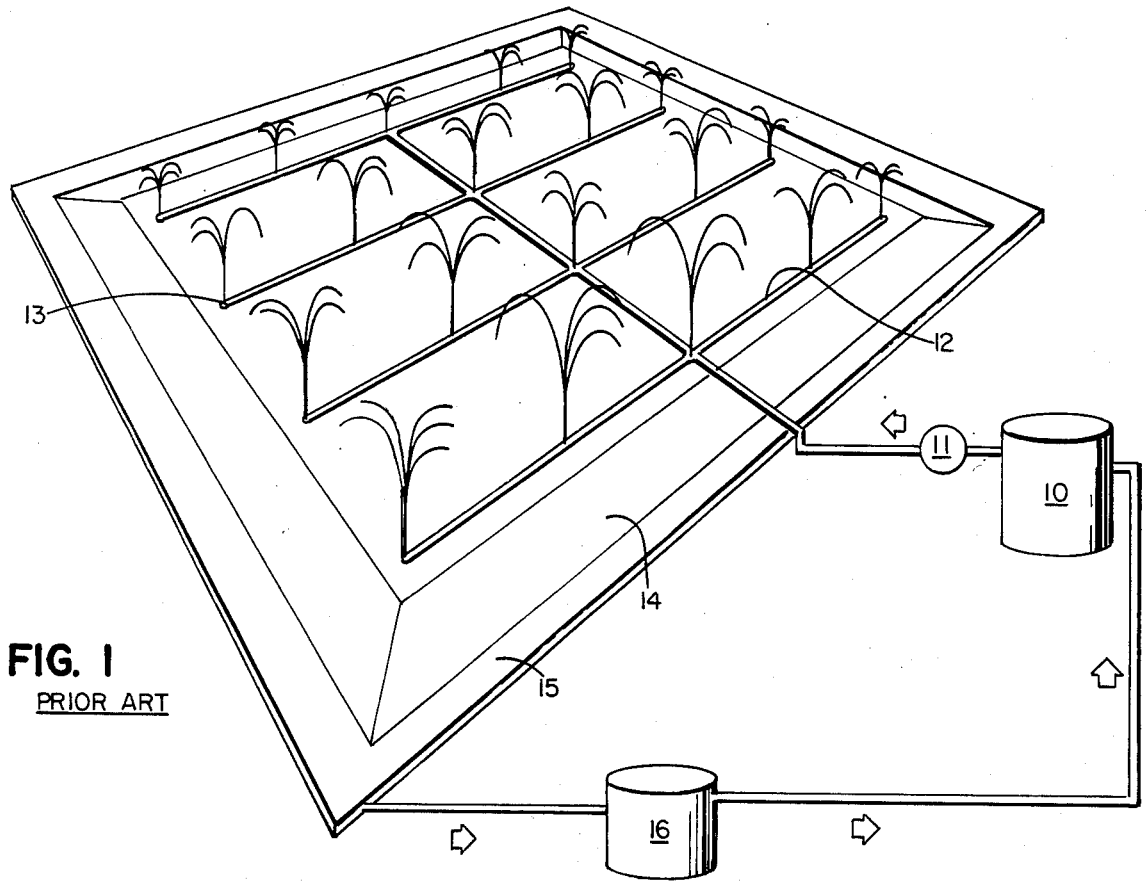
FIG. 1 is a schematic representation of a prior art heap leaching system.

FIG. 1 is a schematic representation of a prior art heap leaching system. Heretofore, in the practice of heap leaching gold ore using sodium cyanide as the lixiviate, the leach solution was forced by means of a pump 11 from the barren solution reservoir 10 through a grid of distribution lines 12, typically plastic tubing, deployed across the top of the ore heap 14. Sprinkler heads 13, spray nozzles, or wriggler tubing connected at various intervals in the distribution line network sprayed the lixiviate solution into the air and onto the ore heap 14. Spraying was necessary not simply for distributing the solution, but for dissolving from the air the oxygen required for the chemical leaching reactions. Pregnant leach solution, having percolated through the heap, accumulates on the impervious pad 15 and flows into a recovery system 16. The recovery system extracts the precious metals and discharges into the barren solution reservoir 10. In the figures, arrows indicate the direction of flow of the lixiviate containing solution.

The following example illustrates a method of carrying out the present invention, but it is to be understood that this example is given by way of illustration and not of limitation.

Figure 2:
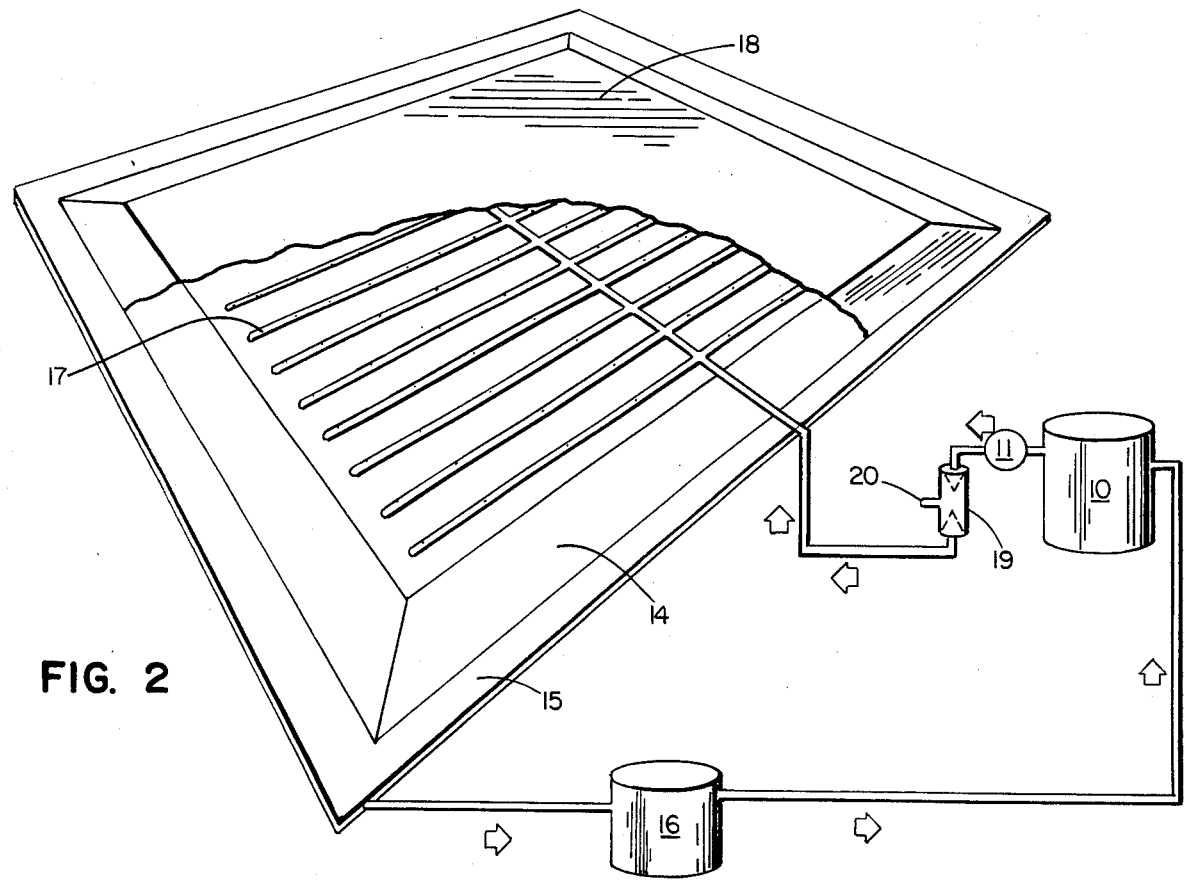
FIG. 2 is a schematic representation of a heap leaching system utilizing a preferred embodiment of the present invention.

FIG. 2 is a schematic representation of a heap leaching system utilizing a preferred embodiment of my invention. A distribution network of drip lines 17 is laid over the ore heap 14. The distribution network of drip lines 17 consists of pipes or tubes that are perforated, porous, slotted, split, or similarly constructed for the purpose of applying lixiviate solution to the ore heap 14. An impervious covering 18, for example, a plastic sheet, preferably flexible, preferably opaque, and preferably black, is spread over and blankets the distribution network of drip lines 17 and the underlying ore heap 14. An alkaline sodium cyanide solution is forced by means of a pump 11 through a venturi eductor 19 and into the distribution network of drip lines 17. The venturi action of the eductor draws air into the suction inlet of the eductor 20 thereby injecting air into the leach solution thus providing a source of oxygen for the chemical leaching reactions and obviating the necessity of spraying the solution into the air. The aerated leach solution enters the distribution network of drip lines 17 and is applied to the ore heap 14. Pregnant leach solution percolates through the heap, accumulates on the impervious pad 15, and flows into a recovery system 16. Various precious metal recovery systems are known to those skilled in the art. For example, precious metals can be adsorbed on to activated carbon or onto resins. The recovery system extracts the precious metals and discharges into the barren solution reservoir 10.

In recent times people have become more aware of environmental pollution. People are beginning to understand the dangers of polluting underground water supplies with toxic chemicals. The impervious covering, described above in a preferred embodiment of my invention, provides a useful means to prevent or to reduce to a minimum wind-blown toxic leach spray contamination to the environment. Other useful benefits also result. The impervious covering minimizes windblown and evaporative water loss. Not only is cooling due to evaporation reduced, but the impervious covering functions as a solar heat collector, warming the leach solution as it is applied to the ore heap. Warmth, as it is well known to skilled artisans, enhances chemical leaching reaction rates thereby improving economic considerations.

Although the present invention has been described in conjunction with a preferred embodiment, it is to be understood that modifications and variations thereto may be resorted to without departing from the spirit and scope of the invention as those skilled in the art will readily understand. For example, the distribution network of drip lines 18 atop the ore heap 14 may be replaced by one or more reservoir ponds wherein berms are used to contain the lixiviate containing solution.

Although the present invention has been described above in conjunction with a preferred embodiment specifically related to heap leaching, it is to be understood that my invention, a system for chemically leaching ore, is more generally applicable.

My invention is also specifically applicable to vat leaching, sometimes called tank leaching.

In another preferred embodiment, an accumulation of ore is loaded into a leaching vat. A lixiviate containing solution is forced by means of a pump through a venturi eductor and into a solution distribution manifold within the leaching vat. A covering, impervious to the lixiviate containing solution, blankets the solution distribution manifold and the accumulation of ore. As the lixiviate containing solution is forced by means of a pump through the venturi eductor, air is drawn into the solution thereby providing a source of oxygen for the chemical leaching reactions. The lixiviate containing solution, after passing through the ore, is removed from the tank by means of a solution collection manifold. The lixiviate containing solution flows into a recovery system, for example, activated carbon columns, and is recycled through the venturi eductor into the leaching vat.

Although the present invention has been described in conjunction with another preferred embodiment, it is also to be understood that modifications and variations thereto may be resorted to without departing from the spirit and scope of the invention as skilled artisans will readily understand. For example, a leaching tank can be used instead of a leaching vat. Even a dammed canyon, gorge, or revine can be used in place of leaching vat. Likewise, activated carbon or resin beads can be added to the ore, with subsequent screening, rather than flowing the lixiviate containing solution through an external recovery system. Such modifications and variations are considered to be within the purview and scope of the invention and the appended claims.

What I claim is:

1. A system for chemically leaching ore, comprising:
   (a) an impermeable pad,
   (b) an accumulation of ore heaped upon said impermeable pad,
   (c) a lixiviate containing solution,
   (d) a solution distribution drip network consisting of perforated, porous, slotted, or split pipes or tubes whereby said lixiviate containing solution is contacted with said accumulation of ore by dripping said lixiviate containing solution from said perforated, porous, slotted, or split pipes or tubes directly onto said accumulation of ore,
   (e) a covering, impervious to said lixiviate containing solution, blanketing said solution distribution drip network and said accumulation of ore,
   (f) means for conveying said lixiviate containing solution under or through said covering and into said solution distribution drip network,
   (g) a venturi eductor whereby air or gases are drawn into said lixiviate containing solution,
   (h) means for pumping said lixiviate containing solution through said venture eductor and into said solution distribution drip network,
   (i) means for collecting said lixiviate containing solution after percolation through said accumulation of ore,
   (j) means for recovering metal values from said lixiviate containing solution.

2. The system of claim 1 wherein said lixiviate containing solution is alkaline and contains sodium cyanide.

3. The system of claim 1 wherein said lixiviate containing solution is acidic and contains thiourea.

4. The system of claim 1 wherein said distribution drip network consists of perforated plastic tubing.

5. The system of claim 1 wherein said covering consists of impervious plastic sheeting.

6. The system of claim 1 wherein the means for conveying said lixiviate containing solution through said covering and into said solution distribution drip network comprises a hole or slit through said covering and a pipe or tube protruded through said hole or slit through which said lixiviate containing solution is conveyed into said solution distribution drip network.

7. A system for chemically leaching ore, comprising:
    (a) an impermeable pad,
    (b) an accumulation of ore heaped upon said impermeable pad,
    (c) a lixiviate containing solution,
    (d) a plurality of reservoir ponds atop said accumulation of ore wherein said lixiviate containing solution accumulates and contacts said accumulation of ore by downward percolation,
    (e) a covering, impervious to said lixiviate containing solution, blanketing said plurality of reservoir ponds and said accumulation of ore,
    (f) means for conveying said lixiviate containing solution under or through said covering and into said plurality of reservoir ponds,
    (g) a venturi eductor whereby air or gases are drawn into said lixiviate containing solution,
    (h) means for pumping said lixiviate containing solution through said venturi eductor and into said plurality of reservoir ponds,
    (i) means for collecting said lixiviate containing solution after percolation through said accumulation of ore,
    (j) means for recovering metal values from said lixiviate containing solution.

8. The system of claim 7 wherein said lixiviate containing solution is alkaline and contains sodium cyanide.

9. The system of claim 7 wherein said lixiviate containing solution is acidic and contains thiourea.

10. The system of claim 7 wherein said plurality of reservoir ponds are configured by a plurality of berms arranged in a grid network.

11. The system of claim 7 wherein said covering consists of impervious plastic sheeting.

12. The system of claim 7 wherein the means for conveying said lixiviate containing solution through a said covering and into said plurality of reservoir ponds comprises a hole or slit through said covering and a pipe or tube protruded through said hole or slit through which said lixiviate containing solution is conveyed into said plurality of reservoir ponds.

13. A system for chemically leaching ore, comprising:
    (a) a vat,
    (b) an accumulation of ore loaded into said vat,
    (c) a lixiviate containing solution,
    (d) a solution distribution manifold consisting of perforated, porous, slotted, or split pipes or tubes whereby said lixiviate containing solution is injected into said vat and contacted therein with said accumulation of ore,
    (e) a covering, impervious to said lixiviate containing solution, blanketing said solution distribution manifold and said accumulation of ore,
    (f) means for conveying said lixiviate containing solution through the wall of said vat and into said solution distribution manifold,
    (g) a venturi eductor whereby air or gases are drawn into said lixiviate containing solution,
    (h) means for pumping said lixiviate containing solution through said venturi eductor and into said solution distribution manifold,
    (i) means for collecting said lixiviate containing solution after percolation through said accumulation of ore,
    (j) means for recovering metal values from said lixiviate containing solution.

14. The system of claim 13 wherein said lixiviate containing solution is alkaline and contains sodium cyanide.

15. The system of claim 13 wherein said lixiviate containing solution is acidic and contains thiourea.

16. The system of claim 13 wherein said solution distribution manifold consists of perforated steel pipes.

17. The system of claim 13 wherein said vat is painted with non-reflective black paint whereby solar collection is improved.

* * * * *